United States Patent [19]
Debler et al.

[11] Patent Number: 5,474,503
[45] Date of Patent: Dec. 12, 1995

[54] AUTOMATIC TRANSMISSION HAVING AUXILIARY DRIVE

[75] Inventors: Edward J. Debler, Sterling Heights; Kenneth C. Young, Livonia; Richard A. Snyder, South Lyon, all of Mich.

[73] Assignee: Ford Motor Company, Dearborn, Mich.

[21] Appl. No.: 172,964

[22] Filed: Dec. 27, 1993

[51] Int. Cl.$^6$ ............................. F16H 37/08; F16H 3/62
[52] U.S. Cl. .......................... 475/205; 475/206; 475/276; 475/281
[58] Field of Search ..................... 475/198, 200, 475/204, 205, 206, 276, 281

[56] References Cited

U.S. PATENT DOCUMENTS

| | | | |
|---|---|---|---|
| 4,449,423 | 5/1984 | Carriere | 475/205 X |
| 4,509,389 | 4/1985 | Vahratian et al. | 475/205 X |
| 4,836,049 | 6/1989 | Moan . | |
| 4,916,977 | 4/1990 | Aoki et al. | 475/205 |
| 4,978,328 | 12/1990 | Pierce . | |

FOREIGN PATENT DOCUMENTS

| | | | |
|---|---|---|---|
| 150643 | 11/1981 | Japan | 475/205 |
| 117943 | 7/1984 | Japan | 475/276 |

*Primary Examiner*—Charles A. Marmor
*Assistant Examiner*—Nathan O. Jensen
*Attorney, Agent, or Firm*—Frank G. McKenzie; Roger L. May

[57] ABSTRACT

A transaxle assembly for use in the driveline of a motor vehicle includes an hydrokinetic torque converter located on an engine axis, a planetary transfer drive gear unit coaxial with the torque converter and engine, a chain drive mechanism for transmitting torque from the engine axis to the axis of a multiple speed automatic transmission, first and second planetary gear units for producing multiple speed ratios, hydraulically actuated friction brakes and clutches for controlling engagement and release of the elements of the planetary gear units, a final drive planetary gearset, an axle differential, and axle shaft drivably connected to the differential side gears.

7 Claims, 3 Drawing Sheets

|  | 68 CL1 | 82 CL2 | 78 CL3 | 108 CL4 | 114 CL5 | 50 CL6 | 54 CL7 | 80 B1 | 112 B2 | DRIVE MODE 70 OWC1 | 76 OWC2 | 114 OWC3 | 46 OWC4 | COAST MODE 70 OWC1 | 76 OWC2 | 114 OWC3 | 46 OWC4 |
|---|---|---|---|---|---|---|---|---|---|---|---|---|---|---|---|---|---|
| 1M | X | X | X |   | X |   | X |   | X | X | N/A | X | X | N/A | X | N/A | N/A |
| 2M | X | X |   |   | X |   | X |   | X | O/R |   | X | X | O/R |   | N/A | N/A |
| 1  | X |   |   |   | X |   | X |   |   | X |   | X | X | O/R |   | O/R | N/A |
| 2  | X | X |   |   | X |   |   |   |   | O/R |   | X | X | O/R |   | O/R | N/A |
| 3  | X | X | X |   | X |   |   |   |   |   | X | O/R | X |   | O/R | O/R | O/R |
| 4  |   | X | X |   | X |   |   | X |   |   | O/R | O/R | X |   | O/R | O/R | O/R |
| 5  |   | X | X |   | X | X |   | X |   |   | O/R | O/R | O/R |   | O/R | O/R | O/R |
| R  | X |   | X | X |   |   | X |   |   | X | N/A |   | X | N/A | X |   | N/A |

NOTE N/A = NO RELATIVE MOTION BUT NOT CARRYING TORQUE

Fig-2

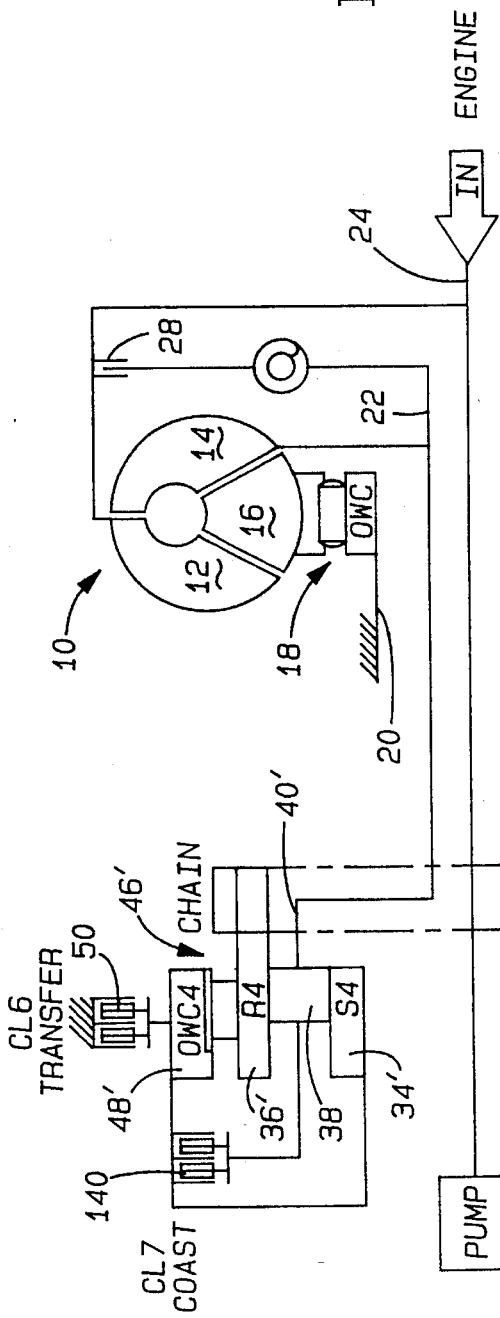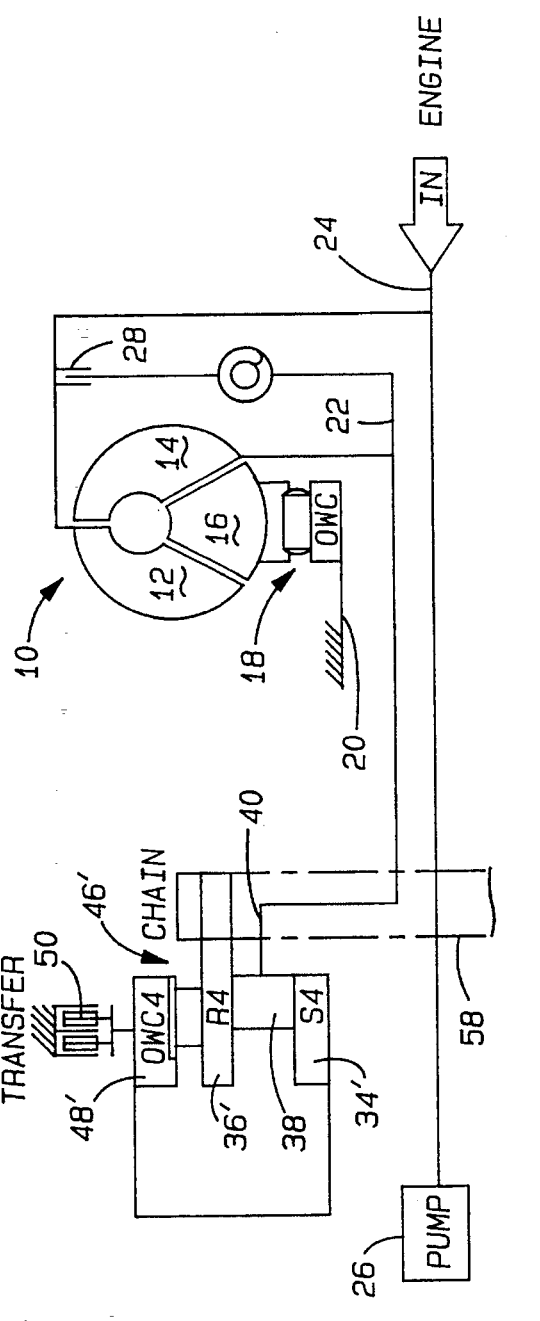

5,474,503

AUTOMATIC TRANSMISSION HAVING AUXILIARY DRIVE

BACKGROUND OF THE INVENTION

1. Field of the Invention

This invention relates generally to multiple-speed automotive vehicle transaxles for use with internal combustion engines. More particularly it pertains to a transaxle having a planetary gear set transfer drive mechanism disposed parallel to multiple-speed gearing.

2. Description of the Prior Art

A transaxle and an engine for an automotive vehicle usually are assembled in a common powertrain package with the axis of the engine crankshaft parallel to the transaxle output shaft axis. The crankshaft axis and the transaxle output shaft axis are transversely mounted in the vehicle in a forward powertrain compartment. The output shaft drives the steerable front wheels of the vehicle through universal joints and halfshaft assemblies.

Examples of transaxles of this kind are shown in U.S. Pat. Nos. 4,607,541 and 4,418,585. Each of these patents describes a pair of simple planetary gear units arranged to define a compound torque flow path with selectively engageable clutches and brakes for establishing the driving speed ratios. The planetary gearing, like the planetary gear arrangement of the present invention, is coaxial with the output shaft axis, or it is parallel to the output shaft axis. That parallel axis is coincident with the hydrokinetic torque converter axis situated between the torque input elements of the gearing and the engine.

Each of these prior art reference patents describes a transaxle capable of achieving four forward driving speed ratios and a single reverse speed ratio. Each of them also describes a hydrokinetic torque converter having a lockup clutch for effecting a mechanical driving connection between the impeller and turbine of the converter.

Because of the constraints that are imposed on an engine powered vehicle driveline by the limited number of ratios available in the planetary gearing, it is not possible with such four speed ratio transaxles to achieve the full performance potential and the full potential for fuel economy that would be available if five or more ratios in the driving range were available.

We are aware of recent attempts to modify existing four speed ratio transmissions to achieve five driving ratios in an automotive vehicle driveline, but these attempts usually involve the use of auxiliary gearing at the torque output portion of the basic four speed ratio gearing. They also include separate clutches and brakes for controlling the driving ratio of an auxiliary transmission. An example of a driveline of this kind may be seen by referring to Ward's Engine Update, an automotive news magazine, dated Jul. 15, 1989, page 6.

Such modifications to normal four speed ratio gear systems have only limited potential for improving efficiency and performance because of the limitations on the ratio spread available by use of auxiliary planetary gearing. Those limitations are imposed by the geometry of the auxiliary planetary gearing itself since the change in ratio range that is available by reason of the addition of the auxiliary gear unit is limited by the available range of pitch diameter ratios of the internal gear and the external gear of the auxiliary planetary gear system. Further, the use of such an auxiliary gear system adds to the overall length of the transmission, which makes it difficult to assembly the transmission in a compact engine and transmission compartment. In most vehicle applications, especially front wheel drive vehicles, styling considerations impose limitations on available space for the powertrain package.

SUMMARY OF THE INVENTION

This invention has as an objective providing five or more forward driving speed ratios without imposing added complexity, weight, and cost of conventional auxiliary gear units in combination with a basic four speed planetary gear system. It is also an objective of this invention to provide a transmission having five or more speed ratios in a driveline of the kind described above wherein the ratio spread of the forward driving ratios can be tailored precisely to match the particular speed-torque characteristics of the internal combustion engine with which the transaxle is used. The invention improves fuel economy when used with large engines and improves performance when used with small engines.

The transmission includes a hydrokinetic torque converter located on the axis of the internal combustion engine crankshaft. Multiple-speed planetary gearing is mounted on a parallel axis which corresponds to the axis of the torque output shaft. Turbine torque of the torque converter is delivered through a turbine shaft and through a drive sprocket mounted on the axis of the torque converter to a driven sprocket mounted on the axis of the output shaft. The driving and driven sprockets are drivably connected by a torque transfer chain.

The transfer drive, mounted coaxially with the torque converter, includes a planetary gear set having a sun gear, ring gear, carrier, and planet pinions rotatably supported on the carrier in continuous meshing engagement with the ring gear and sun gear. An overrunning coupling produces a one-way drive connection between the ring gear and sun gear. A transfer clutch releasably holds the sun gear against rotation on the transmission housing. The ring gear is drivably connected to the driving chain sprocket wheel.

The driven sprocket is connected through selectively engageable clutches to the torque input elements of the multiple-speed planetary gearing. The torque converter and gearing are located in a transaxle housing together with a transmission control valve body and final drive gearing, the latter being located at the torque output end of the multiple-speed gearing.

The final drive gearing includes a planetary reduction gear and a differential gear mechanism, the torque output side gears of the differential gearing being connected to the vehicle traction wheels through halfshaft assemblies. One side gear is connected to a first universal joint driving connection for one halfshaft and the other side gear is connected by a companion universal joint driving connection to the other halfshaft. The latter connection is established by a torque output shaft disposed concentrically with respect to the planetary gearing and the clutches and brakes for the multiple ratio gearing.

The transaxle of this invention may be adapted with minor modifications in the pitch diameter ratios of the torque transfer drive to obtain optimum engine fuel economy and optimum performance and gradeability for the vehicle driveline.

BRIEF DESCRIPTION OF THE DRAWINGS

FIG. 2 is a schedule showing engagement and disengagement of various clutches and brakes and the state of overrunning couplings corresponding to the forward and reverse drive gear ratios of the transmission of FIG. 1.

FIG. 3 is a schematic diagram of an alternate embodiment of the transfer drive.

FIG. 4 is a schematic diagram of yet another embodiment of the transfer drive.

DESCRIPTION OF THE PREFERRED EMBODIMENT

Figure 1:
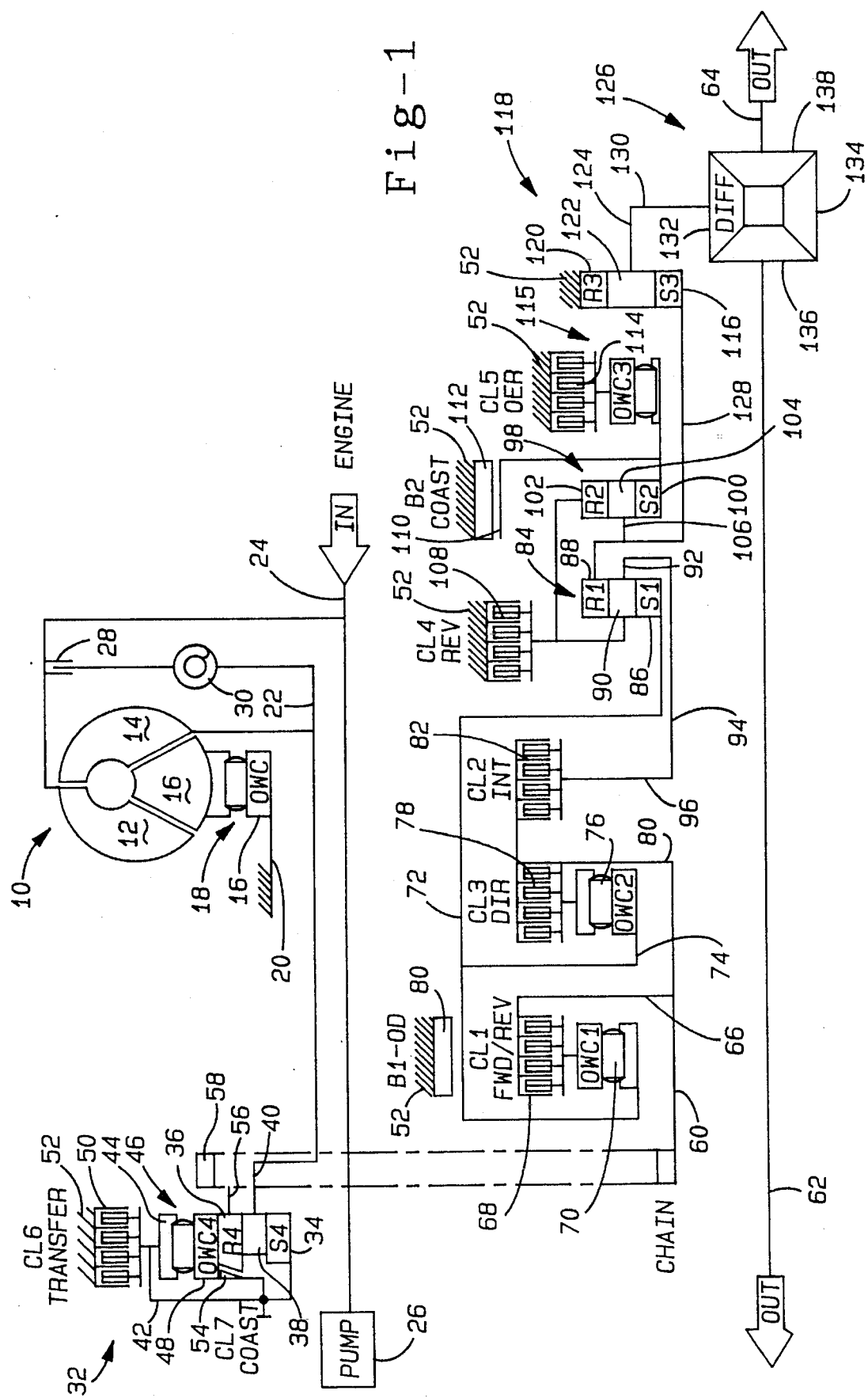
FIG. 1 is a schematic diagram of an automatic transaxle according to this invention.

The torque converter assembly 10, shown in FIG. 1, includes a bladed impeller 12, a bladed turbine 14, and a bladed stator 16. Components of the torque converter are arranged in toroidal fluid flow relationship in the usual fashion. The impeller accommodates radial outflow and the turbine is characterized by radial inflow of the fluid in the torus circuit. A bladed stator located between the flow exit section of the turbine and the flow entrance section of the impeller functions in the usual way to change the tangential direction of the fluid flow velocity vector at the exit of the turbine before the fluid is allowed to enter the entrance region of the impeller. The inner race 16 of overrunning coupling 18 is splined to stator shaft 20. Overrunning coupling 18 is located on the hub of stator 16 and it is adapted to produce a hydrokinetic torque reaction on stationary shaft 20 during operation of the torque converter in the torque multiplication mode.

Turbine sleeve shaft 22 is splined to the turbine hub. It extends through and is supported by the stationary sleeve shaft 20.

The crankshaft of an internal combustion engine 24 is drivably connected to the impeller of hydraulic pump 26, which provides a source of hydraulic fluid for the actuation and control circuit of the transmission. Shaft 24 is directly connected mechanically to the impeller wheel 12 and is selectively connected through lockup clutch 28 and a clutch damper 30 to the turbine wheel 14. When lockup clutch 28 is disengaged, shaft 24 is directly connected to the impeller and turbine 14 is hydrokinetically driven by the impeller. When lockup clutch 28 is engaged, there is a direct mechanical connection between shaft 24 and transmission input shaft 22.

A transfer drive mechanism 32, arranged coaxially with the engine and torque converter, includes a simple planetary gearset comprising a sun gear 34, ring gear 36, carrier 40, and planet pinions 38 supported rotatably on the carrier 40 in meshing engagement with the sun gear and ring gear. Carrier 40 is drivably connected to turbine shaft 22.

Sun gear 34 is drivably connected by a radial member 42 to the outer race 44 of an overrunning coupling 46, which produces a one-way drive connection between member 42 and ring gear 36. The inner race 48 of coupling 46 is either formed integrally with ring gear 36 or is drivably fixed to the ring gear.

A transfer clutch 50 releasably connects member 42 and outer race 44 against rotation on the transmission housing 52 when clutch 50 is engaged.

A cone-type coast clutch 54 operates to drivably connect sun gear 34, outer race 44, and ring gear 36 through operation of one-way clutch 46. Clutch 54 completes this connection by forcing a conical ring on the clutch against a mating conical surface on ring gear 36, thereby preventing the one-way clutch 46 from releasing torque when the vehicle is decelerating.

The inner race 48 of one-way coupling 46 and ring gear 36 are drivably connected to a driving chain drive sprocket wheel 56. A chain 58 is drivably engaged with sprocket wheel 56, supported on shaft 22, and another sprocket wheel, supported on the transmission input shaft 60, so that the chain transmits power between the transfer drive mechanism 32 and the clutch, brake, and planetary gear units that are coaxial about axle shafts 62, 64.

Input shaft 60 is connected by a radial member 66 to an element of a forward/reverse clutch 68, an hydraulically actuated friction clutch, having a second element connected to the outer race of an overrunning coupling 70, adapted to produce a one-way drive connection between clutch 68 and a brake drum 72.

Drum 72 is connected by a radial element 74 to the inner race of a one-way coupling 76, whose outer race is connected to an element of direct clutch 78, an hydraulically actuated friction clutch. Brake drum 72 is engageable selectively by an overdrive brake band 80, which holds drum 72 against rotation on the transmission housing 52.

Shaft 60 is connected by a radial member 80, which is drivably connected to direct clutch 78 and to intermediate clutch 82. Clutch 82 drivably connects member 80 to gear unit 84.

Planetary gear unit 84 includes a sun gear 86, ring gear 88, a set of planet pinions 90 in continuous meshing engagement with sun gear 86 and ring gear 88, and a planet pinion carrier 92 which is drivably connected by sleeve shaft 94 and member 96 to intermediate clutch 82.

A second planetary gear unit 98 includes sun gear 100, ring gear 102, a set of planet pinions 104 in continuous meshing engagement with sun gear 100 and ring gear 102, a pinion carrier that supports rotatably the planet pinions 104. Planet pinion carrier 106 is drivably connected to ring gear 88. Carrier 92 of the gear unit 84 is drivably connected to ring gear 102 of gear unit 98.

Reverse brake 108, an hydraulically actuated friction brake, alternately holds carrier 92 and ring gear 102 against rotation by connecting them to the transmission housing 52.

Sun gear 100 is connected by two torque delivery paths arranged in parallel between the transmission housing 52 and the sun gear. One of the torque delivery paths includes a brake drum 110, which is engaged and released by coast brake band 112, thereby holding the sun gear against rotation on the transmission housing and releasing the sun gear so that it can rotate. The second torque delivery path includes a one-way clutch 115, whose inner race is drivably connected to sun gear 100 and whose outer race is connected to brake 114, an hydraulically actuated friction brake.

Ring gear 88 and planet carrier 106 are mutually drivably connected and connected also by output shaft 128 to the sun gear 116 of a final drive planetary gear unit 118. The final drive includes ring gear 120, continually fixed against rotation on the transmission housing 52, a set of planet pinions 122 continually meshing with sun gear 116 and ring gear 120, and a planet pinion carrier 124, which rotatably supports pinions 122 and is drivably connected to an axle differential 126.

Pinion carrier 124 is connected to the differential spindle, which is drivably connected to differential pinions 132, 134. The differential pinions are in continuous meshing engagement with side bevel gears 136, 138. Side gear 136 is drivably connected to the left-hand axle shaft 62, which extends through sleeve shafts 128, 94, and 60. Side bevel gear 138 is drivably connected to the right-hand axle shaft 64. The axle shafts 62, 64 are connected to the drive wheels of the vehicle.

During operation in the direct drive mode, the torque converter torque is transmitted by shaft 22 and carrier 40, through the sun gear 34-planet pinion 38 mesh, through the outer race 48 of one-way coupling 46, to the ring gear 36, and to the chain drive sprocket wheel 56. In this mode, the components of the planetary gearset 46 have no relative rotation; therefore, the torque ratio through the transfer drive is 1:1.

During operation in the overdrive mode, torque is transmitted similar to the direct drive mode except the transfer clutch 50 is engaged, thereby causing one-way coupling 46 to overrun and cause the ring gear 36 to overdrive carrier 40 and turbine shaft 22. The components of the planetary gearset have relative rotation; therefore, the torque ratio through the transfer drive is less than 1:1.

Referring now to FIG. 3, the transfer drive can be arranged to accommodate a coast clutch used to provide coast braking (engine braking) when desired. FIG. 3 illustrates an hydraulically actuated plate-type friction coast clutch 140, which locks sun gear 34' and outer race 48' of one-way coupling 46' to planet carrier 40', thereby preventing one-way clutch 46' from releasing torque (overrunning) when the vehicle is decelerating (coasting). Ring gear 36' is drivably connected to chain 58.

FIG. 4 is a schematic diagram of a transfer drive without a coast clutch. This transfer drive operates by engaging transfer clutch 50, which grounds sun gear 34' and causes the transfer drive to be locked in the overdrive mode, thereby providing the vehicle with coasting braking.

The mode of operation of the transmission assembly of FIG. 1 is described next. The elements that are identified by reference characters in FIG. 1 are present also in the schedule of FIG. 2, which identifies the clutches and brakes that are engaged and released during operation in each gear ratio in the drive range as well as in the reverse drive mode. The clutches and brakes have been identified in FIGS. 1 and 2 by the symbols "C1", "C2", "C3", "C4", "C5", "C6", "C7", "B1", and "B2", and correspond to the identifying numerals also assigned to those components.

In FIG. 2, the symbol "X" indicates that the clutch or brake is engaged in the corresponding range or speed ratio. FIG. 2 shows also the operating condition of the overrunning clutches 70, 76, 114, 46. The symbol "X" under the columns headed by the one-way couplings indicates that the corresponding overrunning coupling is transmitting torque, the symbol "O/R" indicates that the coupling is overrunning, and the symbol "N/A" indicates that there is no relative motion between the inner race and outer race of the coupling, but that the coupling is not carrying torque.

FIG. 2 shows both a drive condition and a coast condition for the overrunning couplings. During operation in the 1M and 2M ranges, brakes 112 and 114 are applied; therefore, sun gear 100 acts as a torque reaction point in both the drive mode and coast mode. Sun gear 100 is held even though coupling 114 carries no torque in the coast mode because of the parallel drive relationship of brake 112 between sun gear 100 and the transmission casing 52.

Turbine torque is delivered through turbine shaft 22, the transfer drive mechanism, the chain drive mechanism 56, 58, transmission input shaft 60, clutch 68, and coupling 70 to sun gear 86. Sun gear 100 provides the torque reaction for the planetary gearsets 84 and 98, and the output is taken on carrier 106 and output shaft 128.

During operation in the second speed manual range (2M), input shaft 60 is driven by the chain drive mechanism and transfer drive mechanism 32. Although clutch 68 is engaged, coupling 70 overruns. Therefore, shaft 60 drives ring gear 92 of gear unit 84, sun gear 100 is held against rotation due to the engagement of brake 112 and brake 114, and the output is taken at ring gear 88, carrier 106, and output shaft 128.

When the transmission gear selector is placed in the drive or overdrive range, the first forward speed ratio torque delivery path includes input shaft 60, clutch 68, coupling 70, all of which drive sun gear 86. The sun gear 100 of the gear unit 98 is fixed against rotation through operation of brake 114 and coupling 115. The output is taken at ring gear 88, carrier 106, and output shaft 128.

The second forward speed ratio in the automatic range includes input shaft 60, intermediate clutch 82, and carrier 92. The sun gear 100 is held against rotation on the transmission housing through operation of coupling 115 and brake 114. The output is taken at ring gear 88, carrier 106, and output shaft 128.

The third forward speed ratio in the automatic range is a direct drive ratio produced by engagement of clutches 78 and 82. In this way, sun gear 86 and carrier 92 are driven at the speed of shaft 60 and the output is taken at ring gear 88 and output shaft 128.

The fourth speed ratio in the automatic range results through engagement of intermediate clutch 82 and application of brake band 80. Clutch 82 drivably connects input shaft 60 and carrier 92 of the first planetary gear unit 84. Brake band 80 holds sun gear 86 against rotation, thereby providing a torque reaction point for the first planetary gear unit. The output is taken at ring gear 88 and output shaft 128.

To produce the fifth forward speed ratio (an overdrive speed ratio) in the automatic range, transfer clutch 50 is engaged, thereby holding sun gear 34 of the transfer gear fixed against rotation on the transmission housing. This action causes one-way coupling 46 to overrun and ring gear 48 to overdrive carrier 46 and the chain drive mechanism. Input shaft 60 is over-driven in relation to its speed at the lower gear ratios. Shaft 60 is connected through intermediate clutch 82 to carrier 92 of gear unit 84, and sun gear 86 is held against rotation through engagement of brake band 80 on drum 72. The overdrive output is taken at ring gear 88 and output shaft 128.

To produce reverse drive, coast clutch 54 is engaged. Therefore, sun gear 34 and ring gear 36 of the transfer drive gear unit 46 are mutually connected so that the chain sprocket 56 is driven at the speed of turbine shaft 22. Transmission input shaft 60 drives sun gear 86 of gear unit 84 through the forward reverse clutch 68 and one-way coupling 70. Carrier 92 is fixed against rotation due to the engagement of the reverse brake 108. The output is taken at ring gear 88 and output shaft 128.

Having described the preferred embodiment of our invention, what we claim and desire to secure by U.S. Letters Patent is:

1. An automatic transmission for motor vehicles, comprising:

torque converter means mounted on a first axis, having an impeller drivably connectable to a power source and a turbine, connectable to the impeller, for producing a hydrokinetic drive connection between the turbine and impeller;

planetary gearing means mounted on a second axis substantially parallel to the first axis, having an input shaft and output shaft, for producing multiple overdrive and underdrive ratios of the speed of the output shaft to the speed of the input shaft;

a transfer drive means mounted on the first axis, drivably connected to the turbine and input shaft, for driving the input shaft at the speed of the turbine and for overdriving the input shaft with respect to the speed of the turbine but lacking capacity to underdrive the input shaft with respect to the speed of the turbine.

2. The transmission of claim 1 wherein the transfer drive means comprises:

a planetary gear set having a sun gear, ring gear, carrier, and planet pinions, each planet pinion rotatably supported on the carrier in continuous meshing engagement with the ring gear and sun gear;

overrunning coupling means for producing a one-way drive connection between said ring gear and sun gear;

transfer clutch means for releasably holding against rotation said sun gear; and means for drivably connecting said carrier and input shaft.

3. The transmission of claim 2, further comprising coast clutch means for releasably connecting said sun gear and ring gear.

4. The transmission of claim 1, wherein the planetary gearing means further comprises:

first and second planetary gear units, each gear unit having a sun gear, ring gear, carrier, and planet pinions rotatably supported on the carrier in continuous meshing engagement with the ring gear and sun gear, the sun gear of the first gear unit drivably connected to the input shaft, the carrier of the first gear unit drivably connected to the ring gear of the second gear unit, the ring gear of the first gear unit drivably connected to the carrier of the second gear unit and output shaft;

first means for producing a one-way drive connection between the input shaft and sun gear of the first gear unit;

second means fox producing a one-way drive connection between the input shaft and sun gear of the first gear unit;

first clutch means for releasably connecting the input shaft and carrier of the first gear unit;

first brake means for releasably holding against rotation and releasing the carrier of the first gear unit and ring gear of the second gear unit; and second brake means for releasably holding against rotation and releasing the sun gear of the second gear unit.

5. The transmission of claim 4, further comprising:

axle shafts mounted on the second axis;

differential means having an input and an output connected to the axle shafts, for differentially drivably connecting the axle shafts and input; and final drive gearing comprising a ring gear fixed against rotation, a sun gear drivably connected to the output shaft, a planet carrier drivably connected to the input of the differential means, and planet pinions rotatably supported on the carrier and meshing with said sun gear and ring gear.

6. The transmission of claim 2 wherein the means for drivably connecting said carrier and input shaft includes:

a first chain spindle drivably connected to the carrier of the transfer drive means;

a second chain spindle drivably connected to the input shaft; and a drive chain engaged with the first and second chain spindles.

7. An automatic transmission for motor vehicles, comprising:

torque converter means mounted on a first axis, having an impeller drivably connectable to a power source and a turbine, connectable to the impeller, for producing a hydrokinetic drive connection between the turbine and impeller;

planetary gearing means mounted on a second axis substantially parallel to the first axis, having an input shaft and output shaft, for producing multiple overdrive and underdrive ratios of the speed of the output shaft to the speed of the input shaft the planetary gearing means further comprising first and second planetary gear units, each gear unit having a sun gear, ring gear, carrier, and planet pinions rotatably supported on the carrier in continuous meshing engagement with the ring gear and sun gear, the sun gear of the first gear unit drivably connected to the input shaft, the carrier of the first gear unit drivably connected to the ring gear of the second gear unit, the ring gear of the first gear unit drivably connected to the carrier of the second gear unit and output shaft; first means for producing a one-way drive connection between the input shaft and sun gear of the first gear unit; second means for producing a one-way drive connection between the input shaft and sun gear of the first gear unit; first clutch means for releasably connecting the input shaft and carrier of the first gear unit; first brake means for releasably holding against rotation and releasing the carrier of the first gear unit and ring gear of the second gear unit; and second brake means for releasably holding against rotation and releasing the sun gear of the second gear unit;

a transfer drive means mounted on the first axis, drivably connected to the turbine and input shaft, for driving the input shaft at the speed of the turbine and for overdriving the input shaft with respect to the speed of the turbine but lacking capacity to underdrive the input shaft with respect to the speed of the turbine, the transfer drive means comprising a planetary gear set having a sun gear, ring gear, carrier, and planet pinions, each planet pinion rotatably supported on the carrier in continuous meshing engagement with the ring gear and sun gear, overrunning coupling means for producing a one-way drive connection between said ring gear and sun gear, transfer clutch means for releasably holding against rotation said ring gear, and means for drivably connecting said carrier and input shaft; and coast clutch means for releasably connecting said sun gear and ring gear.

* * * * *